(12) United States Patent
Hamdi et al.

(10) Patent No.: US 7,167,975 B2
(45) Date of Patent: Jan. 23, 2007

(54) WIRELESS UNIVERSAL SERIAL BUS LINK FOR A COMPUTER SYSTEM

(75) Inventors: Rabah S. Hamdi, Houston, TX (US); Edward E. Olkkola, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/008,896

(22) Filed: Dec. 10, 2004

(65) Prior Publication Data

US 2005/0144334 A1    Jun. 30, 2005

Related U.S. Application Data

(63) Continuation of application No. 09/052,744, filed on Mar. 31, 1998, now Pat. No. 6,912,651.

(51) Int. Cl.
G06F 13/14    (2006.01)
(52) U.S. Cl. .................. 713/1; 710/104; 710/106; 710/313; 345/158; 345/163
(58) Field of Classification Search .................. 710/12, 710/104, 106, 313; 709/253; 455/6.3; 345/163, 345/158; 713/1
See application file for complete search history.

(56) References Cited

U.S. PATENT DOCUMENTS

| 5,787,259 A | 7/1998 | Haroun et al. |
|---|---|---|
| 5,862,452 A | 1/1999 | Cudak et al. |
| 5,870,080 A | 2/1999 | Burnett et al. |
| 5,890,015 A | 3/1999 | Garney et al. |
| 5,991,546 A | 11/1999 | Chan et al. |
| 5,999,798 A | 12/1999 | Yang |
| 6,009,527 A | 12/1999 | Traw et al. |
| 6,259,405 B1* | 7/2001 | Stewart et al. ............... 342/457 |
| 6,603,744 B2* | 8/2003 | Mizutani et al. ............ 370/310 |
| 6,719,633 B1* | 4/2004 | Leifer et al. .................. 463/39 |

OTHER PUBLICATIONS

Schematic "56K Modem Line Interface," Compaq Drawing No. 70516-000, Compaq Computer Corporation, Jun. 1997.
"An Analysis of Wireless Device Implementations on Universal Serial Bus," USB Wireless White Paper, Jun. 3, 1997.
Universal Serial Bus Specification, Revision 1.0, Jan. 15, 1996.

* cited by examiner

Primary Examiner—A. Elamin

(57) ABSTRACT

A computer system having transceivers coupled to USB ports so as to provide a wireless USB bus between a computer and one or more peripheral devices is disclosed. The transceivers allows the computer to be remotely located from the peripheral devices (e.g., USB devices) by distances substantially greater than five (5) meters, and thus overcomes the five (5) meter limitation on cable length for a USB bus that burdened the conventional wired USB buses. The power utilization of the transceiver is also managed so as to comply with the USB specifications. In one embodiment, the transceivers are radio frequency (RF) transceivers.

19 Claims, 5 Drawing Sheets

WIRELESS UNIVERSAL SERIAL BUS LINK FOR A COMPUTER SYSTEM

CROSS-REFERENCE TO RELATED APPLICATION

This is a continuation of U.S. Ser. No. 09/052,744, entitled "Wireless Universal Serial Bus Link For A Computer System," filed Mar. 31, 1998, U.S. Pat. No. 6,912,651, which is hereby incorporated by reference.

BACKGROUND OF THE INVENTION

1. Field of the Invention

The present invention relates to computer systems and, more particularly, to peripheral buses for a computer system.

2. Description of the Related Art

Computer systems typically include a bus over which data and control signals are exchanged with peripheral devices. These buses are often categorized as either parallel buses or serial buses. Parallel buses include multiple data lines, whereas serial buses include a single data line (or a differential pair of lines). Examples of parallel buses are Interface Standard Association (ISA) and Peripheral Component Interface (PCI). Examples of serial buses are Apple Desktop Bus (ADB), Access.bus, IEEE P1394, Concentration Highway Interface (CHI), and GeoPort.

Recently, an improved serial bus known as Universal Serial Bus (USB) has been developed. USB is an industry standard extension to the personal computer architecture with a focus on Computer Telephony Integration (CTI), consumer and productivity applications. The USB is described in a Universal Serial Bus Specification, Revision 1.0, dated Jan. 15, 1996, which is hereby incorporated by reference. Although the USB specification document explains USB in detail, below the features and operation of USB are summarized for the reader's benefit.

A range of data traffic can be serviced over a USB bus. The transfer rate for the USB bus is up to 12 Mbs. A USB bus also comprehends mid-speed and low-speed data ranges. Typically, mid-speed data transfers are isochronous and low-speed data transfers come from interactive devices. USB is primarily designed as a desktop bus but is also suitable for the mobile environment. USB has various advantages, including: easy peripheral expansion, low cost transfer rate up to 12 Mbs which can support real-time data for voice, audio and compressed video, protocol flexibility for mixed-mode isochronous data transfers and asynchronous messaging, standardized interface, and suitable for various computer configurations and form factors.

USB is a cable bus that supports data exchange between a host computer and a wide range of simultaneously accessible peripherals. The peripherals attached to a USB share the bandwidth of the USB through a host scheduled token based protocol. The USB specification allows peripherals to be attached, configured, used and detached while the host and other peripherals are in operation. Such is often referred to as dynamic (or hot) attachment and removal.

A USB bus connects USB devices with a USB host. There is only one USB host on any USB system. A host controller interfaces the USB bus to the host computer system. The host controller may be implemented in a combination of hardware, firmware or software. The USB physical interconnect is a tiered star topology. A hub is at the center of each star. Each wire segment is a point-to-point connection between the host and a hub or function, or a hub connected to another hub or function.

USB devices are hubs or functions. Hubs provide additional attachment points to the USB. Functions provide capabilities to the system, such as printing, joystick, speakers, or ISDN connection. All the USB devices present a standard USB interface in terms of their comprehension of the USB protocol, their response to standard operations such as configuration and reset, and their standard capability descriptive information.

A USB bus transfers signals and power over a cable having four (4) wires. The signaling occurs over two (2) wires in point-to-point segments. The maximum length of a cable segment is five (5) meters. The signals on each segment are differentially driven into a cable of 90 Ω intrinsic impedance by a differential transmitter. A differential receiver is used to receive the signals at the other end of the cable and has an input sensitivity of at least 200 mV and sufficient common mode rejection.

There are two modes of signaling. The USB full speed signaling bit rate is 12 Mbs. A limited capability of low speed signaling mode is also defined at 1.5 Mbs. Both modes can be simultaneously supported in the same USB system by mode switching between transfers in a device transparent manner. The low speed mode is defined to support a limited number of low bandwidth devices (e.g., mouse), since more general use would degrade the bus utilization. A clock is transmitted encoded along with the differential data. A SYNC field also proceeds each packet to allow the receiver (s) to synchronize their bit recovery clocks.

The USB specification also covers power management aspects. Each USB segment provides a limited amount of power over the cable. The host supplies power for use by USB devices that are directly connected to the host. In addition, any USB device may have its own power supply. USB devices that rely totally on the power from the cable are called bus-powered devices. In contrast, those USB devices that have an alternate source of power are called self-powered devices. A USB hub in turn supplies power for its connected USB devices. The USB specification permits bus-power hubs within certain constraints of topology.

A USB host has a power management system which is independent from that of the USB. The USB system software interacts with the host's power management system to handle system power events such as SUSPEND or RESUME. Additionally, USB devices can carry USB-defined power management information which allows them to be power managed by system software or generic device drivers.

According to the USB bus protocol, all bus transactions involve the transmission of up to three (3) packets. Each transaction begins when the host controller, on a scheduled basis, sends a USB packet describing the type and direction of the transaction, the USB device address, and endpoint number. The packet is referred to as the Token Packet. The USB device that is addressed selects itself by decoding the appropriate address fields. In a given transaction, data is transferred either from the host to a device or from a device to the host. The direction of data transfer is specified in the token packet. The source of the transaction then sends a Data Packet or indicates it has no data to transfer. The destination in general responds with a Handshake Packet indicating whether the transfer was successful.

The USB data transfer model between a source or destination on the host and an endpoint on a device is referred to as a pipe. There are two types of pipes: stream and message. Stream data has no USB defined structure while message data does. Additionally, pipes have associations of data bandwidth, transfer service type, and endpoint characteristics such as directionality and buffer sizes. Pipes come into existence when a USB device is configured. One message pipe, Control Pipe 0, always exists once a device is powered in order to provide access to the device's configuration, status and control information. The transaction schedule allows flow control for some stream mode pipes. At the hardware level, this prevents buffers from underpin or overrun situations by using a NACK handshake to throttle the data rate. The token for a NACK'ed transaction is reissued when the bus time is available. The flow control mechanism permits the construction of flexible schedules that accommodate concurrent servicing of a heterogeneous mix of stream mode pipes. Thus, multiple stream mode pipes can be serviced at different intervals and with packets of different sizes.

The USB supports USB devices attaching to and detaching from the USB at any point in time. Consequently, enumerating the USB is an ongoing activity that must accommodate dynamic changes in the physical bus topology.

All USB devices attach to the USB via a port on specialized USB devices known as hubs. Hubs indicate the attachment or removal of a USB device in its per port status. The host queries the hub to determine the reason for the notification. The hub then responds by identifying the port used to attach the USB device. Thereafter, the host enables the port and addresses the USB device with a control pipe using the USB Default Address. All USB devices are addressed using the USB Default Address when initially connected or after they have been reset.

The host determines if the newly attached USB device is a hub or a function and assigns a unique USB address to the USB device. The host establishes a control pipe for the USB device using the assigned USB address and endpoint number zero (0). If the attached USB device is a hub and USB devices are attached to its ports, then the above procedure is followed for each of the attached USB devices. If the attached USB device is a function, then attachment notifications will be dispatched by the USB software to interested host software.

When a USB device has been removed from one of its ports, the hub automatically disables the port and provides an indication of device removal to the host. Then, the host removes knowledge of the USB device from any host data structures. If the removed USB device is a hub, then the removal process must be performed for all of the USB devices that were previously attached to the hub. If the removed USB device is a function, removal notifications are sent to the interested software.

Bus enumeration is the activity that identifies and addresses devices attached to a bus. For many buses, this is done at start up time and the information collected is static. However, since the USB allows the USB devices to be attached or detached from the USB at any time, bus enumeration for the USB bus is an on-going activity. Additionally, bus enumeration for the USB also includes detection and processing of removals.

USB supports functional data and control exchange between the USB host and a USB device in either a uni-directional fashion or a bi-directional fashion. Data transfers take place between host software and a particular endpoint on a USB device. A given USB device may support multiple data transfer endpoints. The USB host treats communications with any endpoint of a USB device independently from any other endpoint. Such associations between the host software and a USB device endpoint are called pipes. As an example, a given USB device could have an endpoint which would support a pipe for transporting data to the USB device and another endpoint which would support a pipe for transporting data from the USB device.

The USB specification supports four basic types of data transfers: control transfers, bulk transfers, interrupt transfers and isochronous transfers. Control data transfers are used by USB software to configure devices when they are first attached. Bulk data transfers typically consist of larger amounts of data such as used for printers or scanners. Interrupt data transfers are small, spontaneous data transfers from a device The data being transferred is referred to as interrupt data, and such data may be presented for transfer by a device at any time. Interrupt data typically consists of event notification, characters, or coordinates that are organized as one or more bytes. Isochronous data transfers are continuous and real-time in creation, delivery and consumption. Timing related information is implied by the steady state at which isochronous data is received and transferred. Isochronous data must be delivered at the rate received to maintain its timing. In addition to delivery rate, isochronous data must also be sensitive to delivery delays. For isochronous pipes, the bandwidth required is typically based upon the sampling characteristics of the associated function. The latency required is related to the buffering available at each endpoint. The timely delivery of isochronous data is ensured at the expense of potential transient losses in the data stream. In other words, any transmission errors are not corrected by hardware mechanisms such as retries. In practice, the core error rate of the USB is expected to be small enough not to be an issue. USB isochronous data streams are allocated to a dedicated portion of USB bandwidth to ensure that data can be delivered at the desired rate. The USB is also designed for minimal delay of isochronous data transfers.

The USB bandwidth is allocated among pipes. The USB allocates bandwidth for some pipes when a pipe is established. USB devices are required to provide some buffering of data. The goal for the USB architecture is to ensure that buffering induced hardware delays are bounded to within a few milliseconds. The bandwidth capacity of the USB can be allocated to the different data streams. The bandwidth allocation is blocking so that further pipe allocations are denied or blocked if they would disturb preexisting bandwidth or latency allocations. Whenever a pipe is closed, the allocated bandwidth is freed up and may be reallocated to another pipe.

USB devices are divided into device classes such as hub, locator, or text devices. USB devices are required to carry information for self-identification and generic configuration. All USB devices are accessed by a unique USB address. Each USB device additionally supports one or more endpoints with which the host may communicate. All USB devices must support especially designated endpoint zero (0) to which the USB device's USB control pipe will be attached. The information needed to completely describe the USB device is associated with the endpoint zero (0). Additionally, each USB device carries USB control and status information.

Two major divisions of the device classes exist: hubs and functions. Only hubs have the ability to provide additional USB attachment points. Functions, on the other hand, provide additional capabilities to the host.

Hubs are a key element in the plug-and-play architecture of USB. Hubs serve to simplify USB connectivity from the user's perspective and provide robustness at low cost and low complexity. Hubs are wiring concentrators that enable multiple attachment characteristics of USB. Attachment points on the hubs are referred to as ports. Each hub converts a single attachment point into multiple attachment points. The upstream port of a hub connects the hub towards the host. Each of the other downstream ports of a hub allows connection to another hub or function. Hubs can detect attach and detach at each downstream port and enable the distribution of power to the downstream devices. Each downstream port can be individually enabled and configured as either full or low speed. The hub also isolates low speed ports from full speed signaling ports.

A hub consists of two portions: the hub controller and the hub repeater. The hub repeater is a protocol controlled switch between the upstream port and the downstream ports. It also has hardware support for reset and suspense/resume signaling. The hub controller provides the interface registers that allow communication to/from the host. Hub specific status and control commands permit the host to configure a hub and to monitor and control its ports.

A function is a USB device that is able to transmit or receive data or control information over the bus. A function is typically implemented as a separate peripheral device with a cable that plugs into a port on a hub. However, a physical package may implement multiple functions and an embedded hub with a single USB cable. This is known as a compound device. Each function contains configuration information that describes its capabilities and resource requirements. Before a function can be used, it must be configured by the host. This configuration includes allocating USB bandwidth and selecting function specific configuration options. Examples of functions are: locator devices such as a mouse, tablet, or light pen; input devices such as a keyboard; output devices such as a printer; and telephony adapters such as an ISDN adapter.

The USB host interacts with the USB devices through the host controller. The host and its associated host controller are responsible for managing the use of the USB. Specifically, the host is responsible for detecting the attachment and removal of USB devices, managing control flow between the host and USB devices, managing data flow between the host and USB devices, collecting status and activity statistics, and providing a limited amount of power to attached USB devices.

The USB system software on the host manages interactions between the USB devices and the host-based device software. The general areas of interactions between the USB system software and the device software are: device enumeration and configuration, isochronous data transfers, asynchronous data transfers, power management, and device and bus management information.

FIG. 1 is a block diagram of a conventional computer system 100 that utilizes a Universal Serial Bus (USB). The computer system 100 includes a personal computer 102 that includes among other things a USB port 104. A USB bus 106 connects the USB port 104 to a USB hub 108. The USB bus 106 is a cable consisting of four (4) wires. The USB hub 108 provides a plurality of USB ports 110, 112 and 114. Each of these ports 110, 112 and 114 are capable of coupling to a USB device or another USB hub. Specifically, as in the example illustrated in FIG. 1, the USB port 110 connects to a printer 116 through a USB bus link 118. The USB port 112 connects to an input device 120 through a USB bus link 122. As an example, the input device could be a mouse, a keyboard, a tablet, etc.

The USB bus 106 of the computer system 100 thus provides an electrical connection over which control and data information can pass between the personal computer 102 and the various peripheral devices such as the printer 116 and the input device 120. According to the USB specification, the length of the cable associated with the USB bus 106 has a maximum length of five (5) meters. The length of the cable for the USB bus is restricted to not more than five (5) meters primarily for electrical design reasons.

Accordingly, to use USB buses, the personal computer 102 is required to be within 5 meters of a USB hub and/or the USB devices. However, it is not always easy to maneuver a personal computer to within five (5) meters of the desired peripheral device. This physical constraint on computer systems desiring to use a USB bus is therefore problematic and unsatisfactory in many cases.

Thus, there is a need for improved ways to utilize a USB bus without being burdened by the five (5) meter limitation on cable length for a USB bus.

SUMMARY OF THE INVENTION

Broadly speaking, the invention provides transceivers which can be interfaced to USB ports so as to provide a wireless USB bus between a computer and one or more peripheral devices. The invention allows the computer to be remotely located from the peripheral devices (e.g., USB devices) by distances substantially greater than five (5) meters, and thus overcomes the five (5) meter limitation on cable length for a USB bus that burdened the conventional wired USB buses. The power utilization of the transceiver is also managed so as to comply with the USB specifications. In one implementation, the transceivers are radio frequency (RF) transceivers.

The invention can be implemented in numerous ways, including as a system, a device, an apparatus, and a method. Several embodiments of the invention are summarized below.

As a computer system, an embodiment of the invention includes: a computer including at least a USB port; a peripheral device including at least a USB port; a first transceiver coupled to the USB port of the computer; and a second transceiver coupled to the USB port of the peripheral device. The first and second transceivers cooperate to form a wireless USB bus between the computer and the peripheral device.

Preferably, the peripheral device is a USB device such as a hub or a function. It is also preferable that the computer include a bus controller that controls the wireless USB bus formed between the computer and the peripheral device.

As a radio frequency transceiver apparatus for providing a wireless USB bus, an embodiment of the invention includes: a USB connector for connecting to a hosting device; a USB interface electrically connected to the USB connector; a radio frequency transceiver electrically connected to the USB interface, the transceiver transmits and receives radio frequency signals; and an antenna operatively connected to the transceiver.

As a method for transmitting data over a USB bus from a computer to a peripheral device, an embodiment of the invention includes the acts of: providing a first transceiver at the computer, the first transceiver being coupled to a USB host controller that controls a USB bus for the computer; providing a second transceiver at the peripheral device; and establishing a wireless USB bus link between the first and second transceivers, the wireless USB bus link being part of the USB bus.

The advantages of the invention are numerous. One advantage of the invention is that freedom and mobility of access to USB devices is provided because the maximum cable length limitation is avoided. Another advantage of the invention is that USB devices are able to communicate with any USB hub using radio frequency signals, and thus allows USB devices to be shared. Still another advantage of the invention is that the wireless USB provided by the invention can be used for various purposes such as wireless networking with a server.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to a computer system that has transceivers coupled to USB ports so as to provide a wireless USB bus between a computer and one or more peripheral devices. The transceivers allows the computer to be remotely located from the peripheral devices (e.g., USB devices) by distances substantially greater than five (5) meters, and thus overcomes the five (5) meter limitation on cable length for a USB bus that burdened the conventional wired USB buses. The power utilization of the transceiver is also managed so as to comply with the USB specifications. In one implementation, the transceivers are radio frequency (RF) transceivers.

Embodiments of the invention are discussed below with reference to FIGS. 2–7. However, those skilled in the art will readily appreciate that the detailed description given herein with respect to these figures is for explanatory purposes as the invention extends beyond these limited embodiments.

Figure 1:
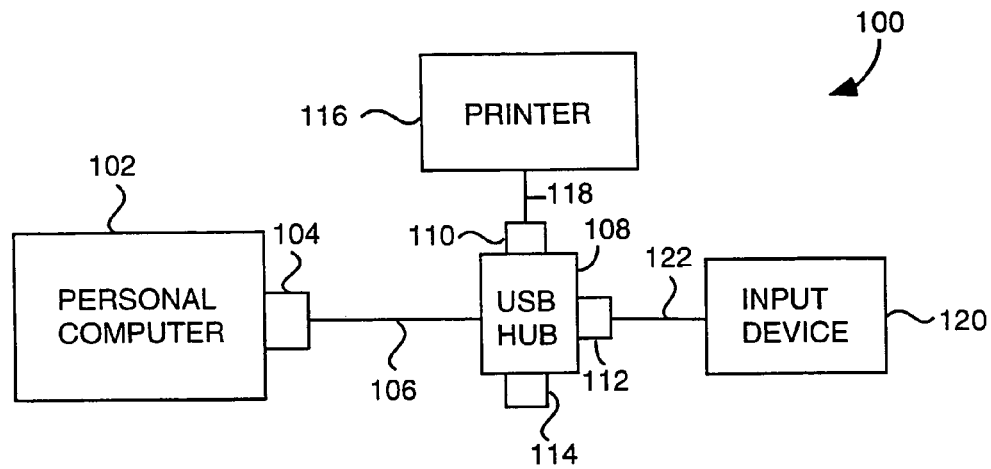
FIG. 1 is a block diagram of a conventional computer system that utilizes a Universal Serial Bus (USB)
Figure 2:
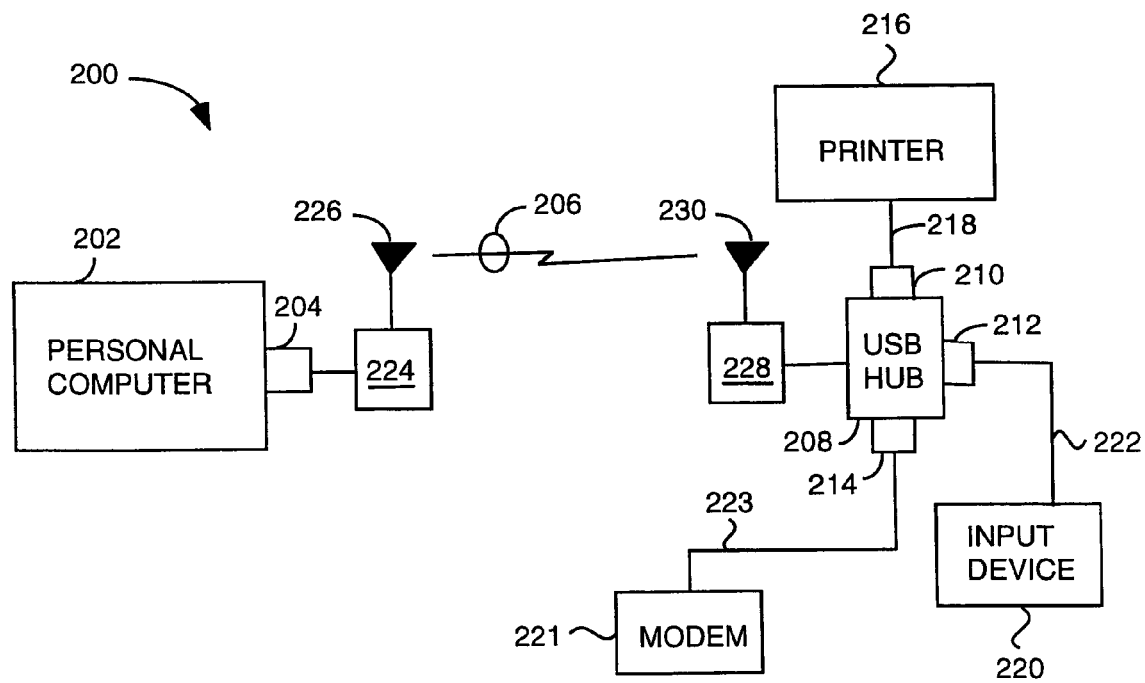
FIG. 2 is a diagram of a computer system according to a basic embodiment of the invention.

FIG. 2 is a diagram of a computer system 200 according to a basic embodiment of the invention. The computer system 200 is similar in certain ways to the computer system 100 illustrated in FIG. 1. However, the computer system 200 replaces the cable associated with the USB bus 106 with a wireless Universal Serial Bus (USB) as explained below.

The computer system 200 includes a personal computer 202 that includes among other things a USB port 204. A wireless USB bus 206 connects to the USB port 204 to a USB hub 208. The wireless USB bus 206 uses radio frequency (RF) transmissions to communicate between the personal computer 202 and the USB hub 208. The USB hub 208 provides a plurality of USB ports 210, 212 and 214. Each of these ports 210, 212 and 214 are capable of coupling to a USB device or another USB hub. Specifically, in the example illustrated in FIG. 2, the USB port 210 connects to a printer 216 through a USB bus link 218. The USB port 212 connects to an input device 220 through a USB bus link 222. As an example, the input device could be a mouse, a keyboard, a tablet, etc. The USB port 214 connects to a modem 221 through USB bus link 223. As an example, the modem 221 can be a high performance modem such as an ISDN adapter or a Digital Subscriber Line (DSL) modem. Also, the modem 221 can be a bus-powered modem such as disclosed in U.S. application Ser. No. 09/052,815, filed on Mar. 31, 1998, U.S. Pat. No. 6,408,351, issued Jun. 18, 2002, which is hereby incorporated by reference.

In this embodiment, the wireless USB bus 206 (or wireless USB bus link) is implemented by a pair of transceivers and their associated antennas. More particularly, in the computer system 200, a first transceiver 224 couples to the USB port 204 of the personal computer 202. The first transceiver 224 is capable of transmitting and receiving radio frequency (RF) signals via an antenna 226 coupled to the first transceiver 224. The radio frequency (RF) signals carry data and control information. Similarly, a second transceiver 228 is coupled to the USB hub 208. The second transceiver 228 transmits and receives data and control information using radio frequency (RF) signals via an antenna 230.

Accordingly, the computer system 200 uses a pair of transceivers 224 and 228 to provide a wireless USB bus link 206 between the personal computer 202 and the USB hub 208. Consequently, the five (5) meter limitation on the cable for the USB bus 106 according to the USB specification is no longer applicable because the wireless USB bus provided by the transceivers 224 and 228 replaces the cable so as to permit the personal computer 202 to be further away from the USB hub 208 more than five (5) meters.

Although in FIG. 2 the transceiver 228 is coupled to the hub 208, the transceiver could instead connect directly to a functional device. For example, the transceiver 228 could be coupled to or integral with the printer 216, in which case the wireless USB bus would be formed between the personal computer 202 and the printer 216. The advantage of connecting the transceiver 228 to the hub 208 is that the transceiver 228 is effectively shared by all USB devices that couple to the hub 208.

Also, a different personal computer having a transceiver could also share the hub 208 and the USB devices coupled thereto with the personal computer 202. Here, multiple USB bus links are formed with the hub 208. For example, two different personal computers having transceivers could print to the printer 216 directly when the printer has the transceiver or via the hub 208 when the hub 208 has the transceiver.

Figure 3:
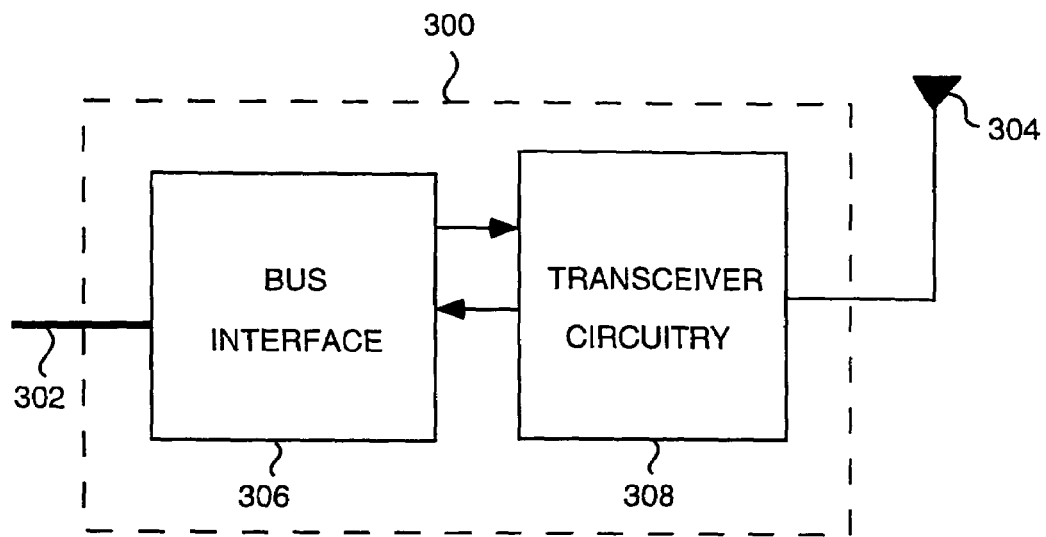
FIG. 3 is a block diagram of a transceiver according to an embodiment of the invention.

FIG. 3 is a block diagram of a transceiver 300 according to an embodiment of the invention. The transceiver 300, for example, is suitable for use as the first transceiver 224 or the second transceiver 228 illustrated in FIG. 2.

The transceiver 300 includes a link 302 that connects to a USB port or directly to a USB device. The USB device can be a USB hub or a USB enabled functional device. The transceiver 300 also couples to an antenna 304 which operates to transmit and receive the radio frequency (RF) signals. The transceiver 300 itself includes a bus interface 306 and transceiver circuitry 308. The bus interface 306 operates to interface the transceiver 300 with a USB device or a USB host. The bus interface 306 provides data and control information to be transmitted by the transceiver circuitry 308, and receives data and control information received by the transceiver circuitry 308. The transceiver circuitry 308 has a transmit path where the data and control information to be transmitted is modulated onto a carrier wave as analog signals, and the analog signals are coupled to the antenna 304. The transceiver circuitry 308 also includes a receive path where incoming analog signals are obtained from the antenna 304 and then demodulated to extract the incoming data and control signals from the incoming analog signals received via the antenna 304.

Figure 4:
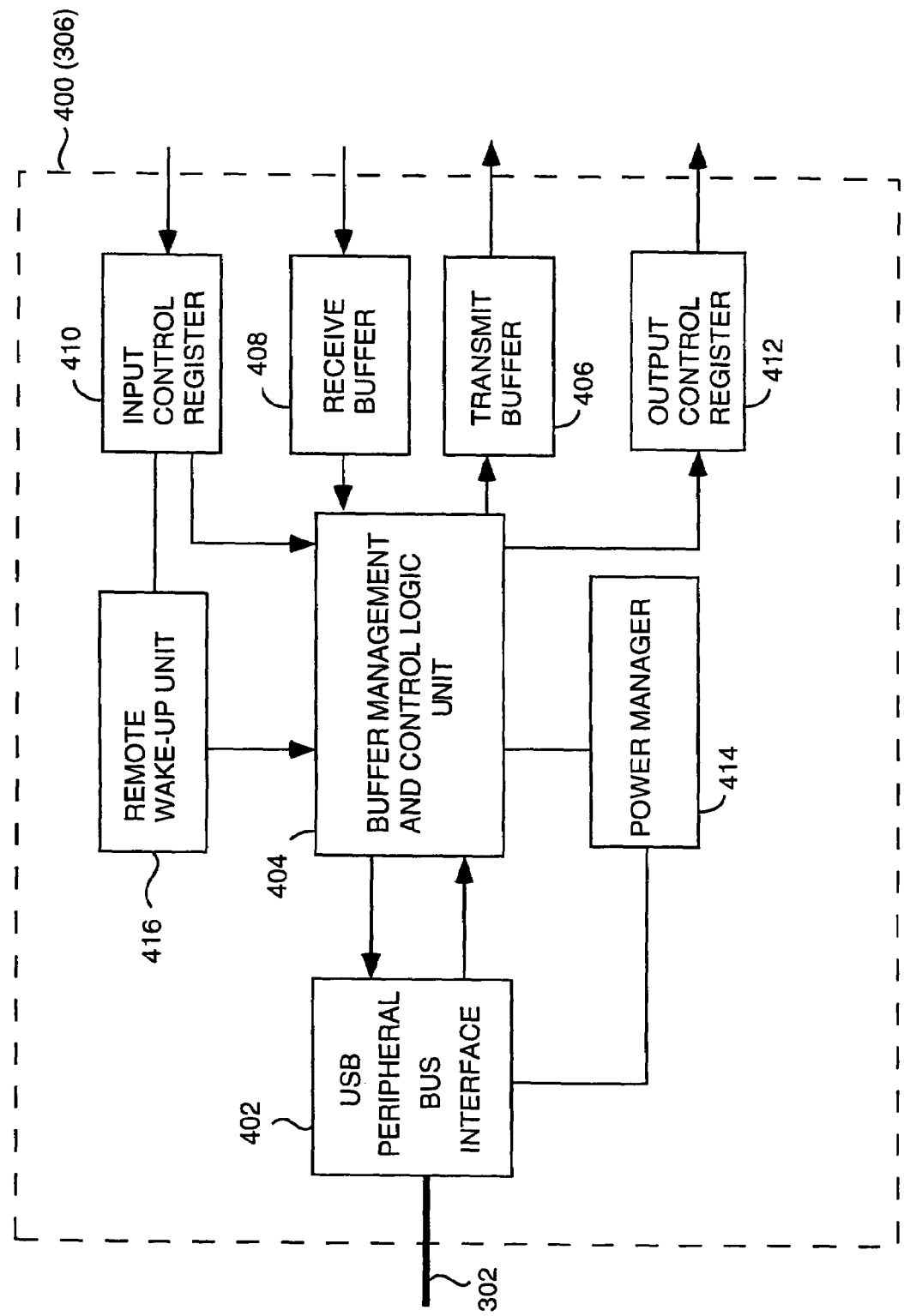
FIG. 4 is a block diagram of a bus interface according to an embodiment of the invention.

FIG. 4 is a block diagram of a bus interface 400 according to an embodiment of the invention. The bus interface 400, for example, can be used as the bus interface 306 of the transceiver 300 illustrated in FIG. 3.

The bus interface 400 includes a USB peripheral bus interface 402 that couples to the USB link 302. Data and control information are transmitted over the USB link 302 to and from the bus interface 400. The USB peripheral bus interface 402 manages the transmission of control and data information over the USB link 302. Incoming data and control information over the USB link 302 is supplied to a buffer management and control logic unit 404. The buffer management and control logic unit 404 then forwards the data to a transmit buffer 406. The control information is evaluated by the buffer management and control logic unit 404 which controls the bus interface 400 as appropriate given the control information. Similarly, incoming data and control information from the transceiver circuitry 308 is supplied to the buffer management and control logic unit 404. The data is received at a receive buffer 408 and then supplied to the buffer management and control logic unit 404. Eventually, the incoming data from the transceiver circuitry 308 is supplied to the USB link 302. The transmit buffer 406 and the receive buffer 408 operate to buffer the data being transmitted or received over the wireless bus until the data is able to processed.

As for the control information, the bus interface 400 receives control information to the transceiver circuitry 308 through an input control register 410. The input control register 410 forwards the incoming control information to the buffer management and control logic unit 404. The buffer management and control logic unit 404 in turn controls the USB interface 400 in accordance with the incoming information and/or forwards the control information (or a modified version thereof) over the USB link 302. Typically, this control information would be sent to a USB host controller that manages the activities on the USB bus.

Also, the bus interface 400 also receives incoming control information over the USB link 302 (e.g., such as from a USB host controller) which is forwarded to the buffer management and control logic unit 404. The buffer management and control logic unit 404 in turn controls the USB interface 400 in accordance with the incoming control information and/or forwards the control information to the transceiver circuitry 308 by an output control register 412. Of course, the control information can be modified or altered by the buffer management and control logic unit 404 before setting the state of the output control register 412 so as to convey the control information.

The bus interface 400 further includes a power manager 414. The power manager 414 operates to manage the power of the transceiver 300 such that it complies with the USB specification. In particular, the power manager 414 can place the transceiver 300 in a low power state or an active power state. The power manager 414 typically places the transceiver 300 in a low-power state when the USB bus has been suspended, and places the transceiver 300 in an active state when the USB bus is active. The control information received either over the USB link 302 or the input control register 410 can include power control information. The power control information is used by the power manager 414 to manage the power of the transceiver 300. Although the power manager 414 is within the USB bus interface 400, the power of the transceiver circuitry 308 can also be managed by the USB bus interface 400 by supplying power control information to the transceiver circuitry 308 using the output control register 414. Hence, the transceiver circuitry 308 is able to obtain the power control information from the USB bus interface 400 via the output control register 412.

The bus interface 400 also includes a remote wakeup unit 416. The remote wakeup unit 416 is able to monitor the input control register 410 and determine if a wakeup request has been made by a remote USB device at the other end of the wireless USB bus. The input control register 410 receives certain control information from the transceiver circuitry 308. For example, if a remote USB device requests use of a USB bus, the USB bus must be awakened to an active mode if it was in a suspend mode. When the remote wakeup unit 416 determines that a remote wakeup has been requested, then it sends a wakeup request to the buffer management and control logic unit 404. The buffer management and control logic unit 404 together with the USB peripheral bus interface 402 then operate to send a wakeup request over the link 302 to the host USB controller. In one embodiment, the wakeup of the USB bus is controlled by the USB bus controller which wakes up the USB bus by signaling the USB bus interface 400 to wakeup via the link 302. The power manager 414 then wakes up the USB bus interface 400 and the transceiver circuitry 308 (via the output control register 412).

Figure 5:
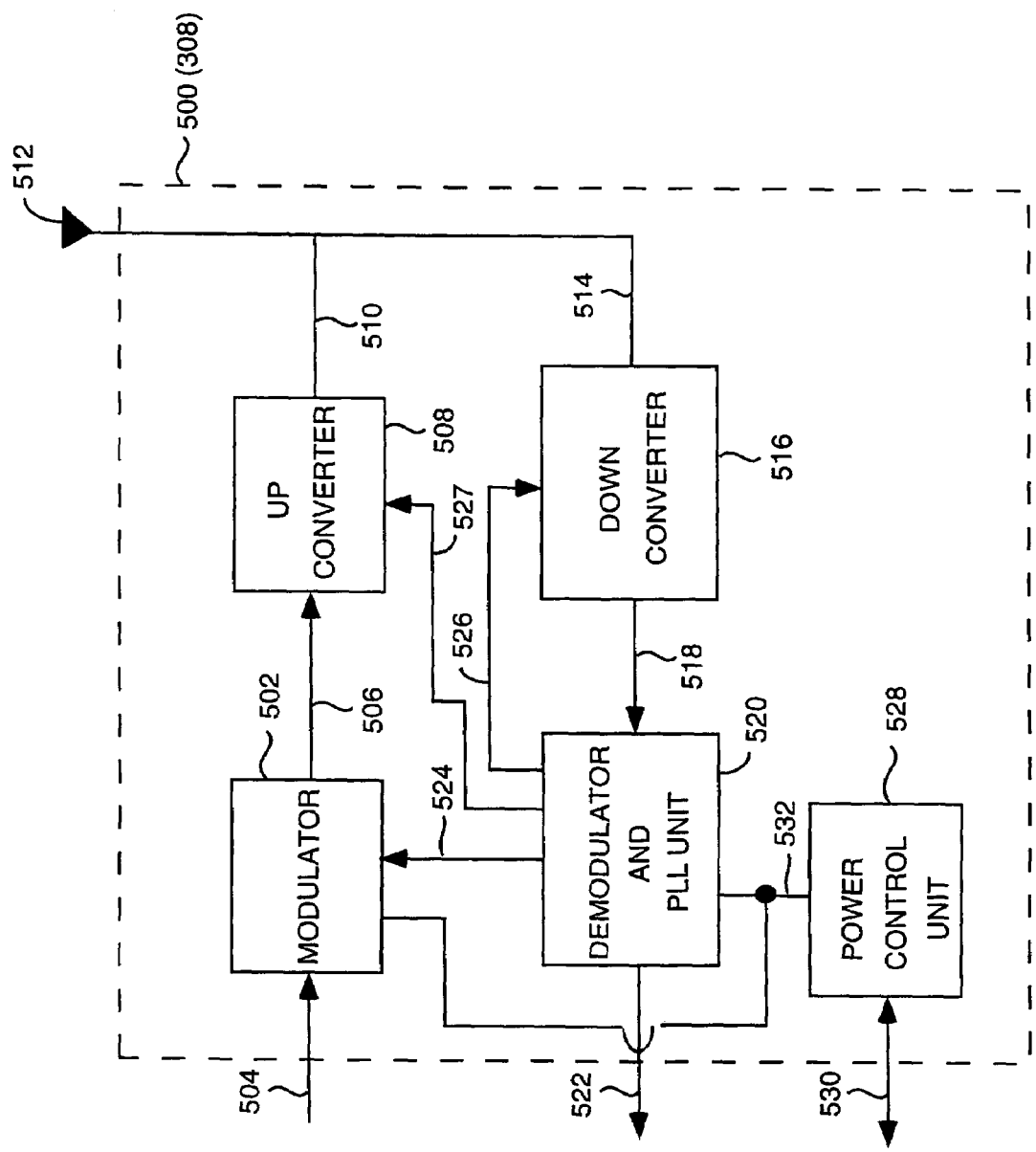
FIG. 5 is a block diagram of transceiver circuitry according to an embodiment of the invention.

FIG. 5 is a block diagram of transceiver circuitry 500 according to an embodiment of the invention. The transceiver circuitry 500, for example, is suitable for use as the transceiver circuitry 308 illustrated in FIG. 3.

The transceiver circuitry 500 includes a modulator 502 that receives digital signals 504 to be transmitted. The incoming digital signals 504 are modulated by the modulator 502 and converted to analog signals 506. The frequency of the analog signals 506 is then increased by an up converter 508. The resulting analog signals 510 from the up converter 508 are then supplied to an antenna 512. This completes a transmit path through the transceiver circuitry 500.

In the receive direction, analog signals 514 are received from the antenna 512 and supplied to a down converter 516. The down converter 516 lowers the frequency of the received signals 514 to produce baseband analog signals 518. The transceiver circuitry 500 also includes a demodulator and phase lock loop (PLL) unit 520. The demodulator and PLL unit 520 receives the baseband analog signals 518 and produces received digital data 522 by converting and demodulating the baseband analog signals 518. This completes a receive path through the transceiver circuitry.

Further, a PLL portion of the demodulator and PLL unit 520 produces a first synchronization signal 524 that is supplied to the modulator 502, a second synchronization signal 526 that is supplied to the down converter 516, and a third synchronization signal 527 that is supplied to the up converter 508. The PLL portion generally operates to monitor the receive signals to identify a data recovery synchronization timing, then tracks the data recovery synchronization timing to ensure it remain accurate, and also generates synchronization signals to lock (timing lock) the transmissions and receptions. The first, second and third synchronization signals 524, 526 and 528 are thus produced by the PLL portion provide the timing lock. A demodulator portion of the demodulator and PLL unit 520 provides the demodulation operations on the incoming receive signals.

The transceiver circuitry 500 also includes a power control unit 528. The power control unit 528 receives power control information 530 from the bus interface 306, 400. In one embodiment, the power control information 530 can be obtained from the output control register 412. The power control unit 528 can also send power control information to the bus interface 306, 400 via the input control register 410. The power control unit 528 operates to place the transceiver circuitry 500 in either a suspend (i.e., low-power) mode or an active mode. The power control unit 528 is able to place the transceiver circuitry 500 in a suspend mode by supplying a control signal 532 to both the modulator 502 and the demodulator and PLL unit 520. The control signal 532 operates to either activate or deactivate the modulator 502 and the demodulator 520. When deactivated, the modulator 502 and the demodulator and PLL unit 520 consume substantially less power than when the devices are active. Hence, the power consumption of the transceiver 300 is able to satisfy the low power consumption requirement of the USB specification for the suspend mode.

As one example, the digital signals 504 are received at a rate of 12 Mbps and then modulated and converted by the modulator to produce the analog signal 506 at a frequency of 100 MHz. The up converter 508 converts the 100 MHz analog signals to 2.4 GHz analog signals 510 which are coupled to the antenna 512. With received analog signals 514 at 2.4 GHz from the antenna 512, the down converter 516 produces the baseband analog signals 518 at a frequency of 30 MHz. The baseband analog signals 518 are then supplied to the demodulator and PLL unit 520 which produces the received digital data 522 therefrom. Also, in another example, the modulation and demodulation is QPSK modulation and QPSK demodulation, respectively.

Figure 6:
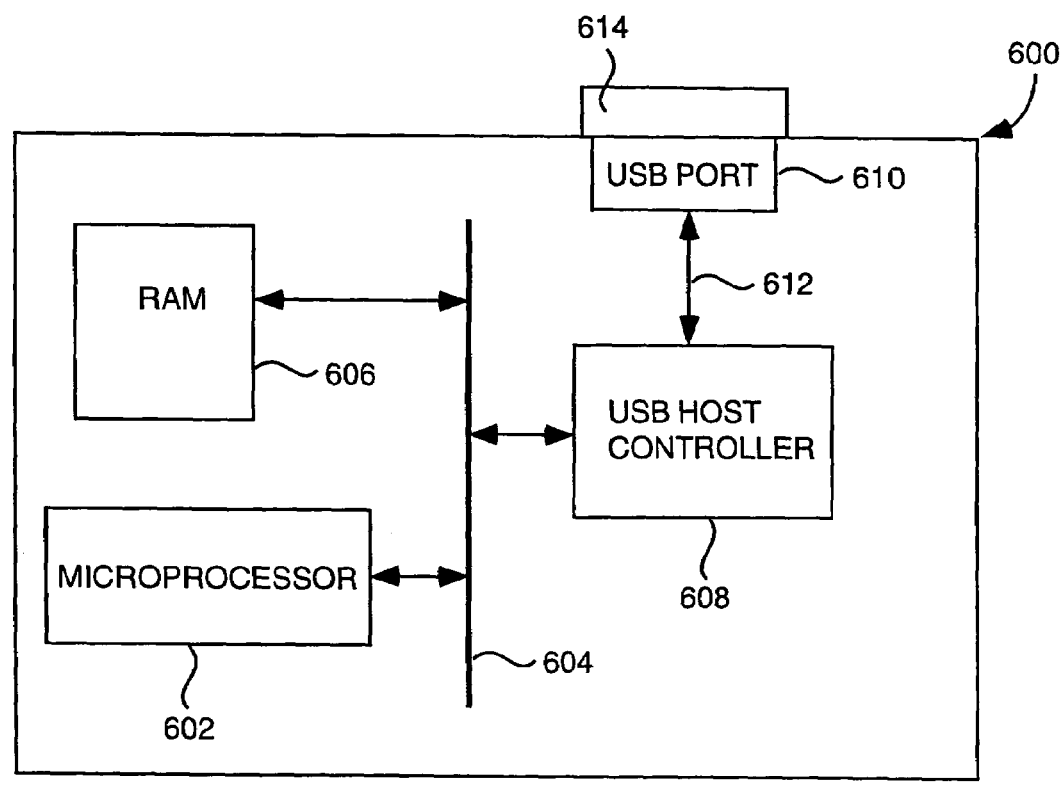
FIG. 6 is a block diagram of a personal computer according to an embodiment of the invention.

FIG. 6 is a block diagram of a personal computer 600 according to an embodiment of the invention. The personal computer 600 represents a simplified personal computer such as suitable for use as the personal computer 102 illustrated in FIG. 2.

The personal computer 600 includes a microprocessor 602 for executing instructions. The microprocessor 602 is connected to a system bus 604. Also connected to the system bus 604 is a random access memory (RAM) 606. The RAM 606 stores instructions and data used by the microprocessor 602. A USB host controller 608 is also connected to the system bus 604. The USB host controller 608 operates to control and manage the operation of a USB bus. A USB host controller 608 is coupled to a USB port 610 of the personal computer 600. The USB port 610 couples to the USB host controller 608 through a USB bus link 612. The USB bus link 612 represents the portion of the USB bus that is internal to the personal computer 600. Typically, the USB port 610 would be placed at the outer periphery of a housing for the computer system 600. Furthermore, a connector 614 for the USB port 610 is also typically provided at the outer periphery of the housing for the computer system 600. For example, a transceiver, such as the transceiver 202 illustrated in FIG. 2, can connect to the personal computer 600 by connecting a suitable connector with the connector 614. In one embodiment, a transceiver has a short cable with a suitable connector at one end that is used to connect to the USB port (i.e., connector 614) of a personal computer.

Figure 7:
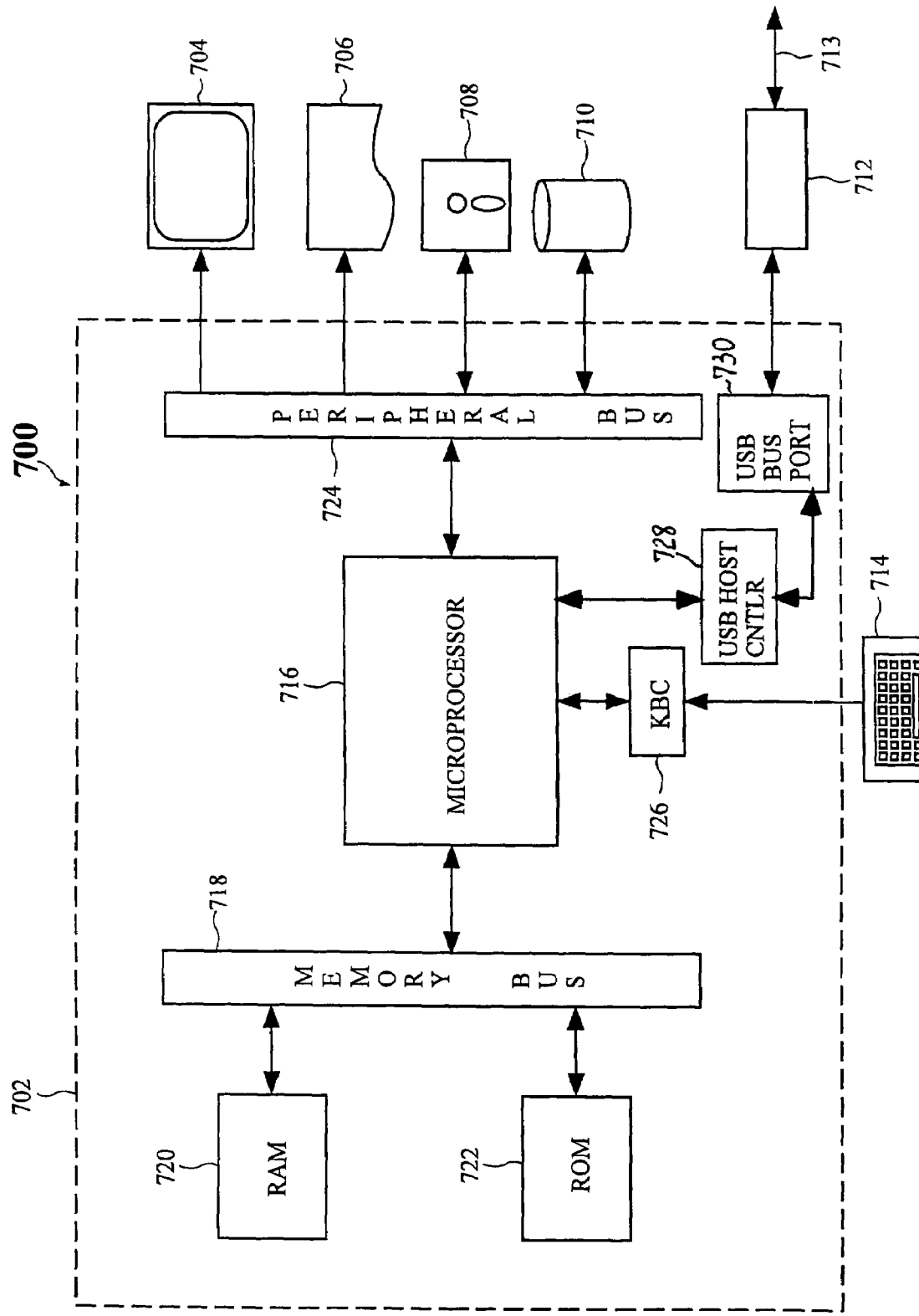
FIG. 7 is a block diagram of an exemplary computer system for hosting a USB bus according to an embodiment the invention.

The invention can be employed in various different computer systems. The computer systems are normally general purpose machines, but could also be specialized machines. FIG. 7 is a block diagram of an exemplary computer system 700 for hosting a USB bus according to an embodiment the invention. The computer system 700 is explained in more detailed than was the computer 600 illustrated in FIG. 6.

The computer system 700 includes a digital computer 702, a display screen (or monitor) 704, a printer 706, a floppy disk drive 708, a hard disk drive 710, a USB device 712, a USB bus 713, and a keyboard 714. The digital computer 702 includes a microprocessor 716, a memory bus 718, random access memory (RAM) 720, read only memory (ROM) 722, a peripheral bus 724, a keyboard controller 726, a USB host controller 728, and a USB bus port 730. The digital computer 700 can be a personal computer (such as an IBM compatible personal computer).

The microprocessor 716 is a general purpose digital processor which controls the operation of the computer system 700. The microprocessor 716 can be a single-chip processor or can be implemented with multiple components. Using instructions retrieved from memory, the microprocessor 716 controls the reception and manipulation of input data and the output and display of data on output devices. According to the invention, a particular function of microprocessor 716 provides manage and control the USB host controller 728 and the USB bus 713 coupled thereto. The USB host controller 728 can be implemented in a combination of hardware, firmware or software.

The memory bus 718 is used by the microprocessor 716 to access the RAM 720 and the ROM 722. The RAM 720 is used by the microprocessor 716 as a general storage area and as scratch-pad memory, and can also be used to store input data and processed data. The ROM 722 can be used to store instructions or program code followed by the microprocessor 716 as well as other data.

The peripheral bus 724 is used to access the input, output, and storage devices used by the digital computer 702. In the described embodiment, these devices include the display screen 704, the printer device 706, the floppy disk drive 708, the hard disk drive 710.

The USB host controller 728 is used to control and manage a USB bus 713 that is supplied to the USB bus port 730. The USB bus 713 is a special peripheral bus that can be used to access the input, output, and storage devices used by the digital computer 702. By connecting a USB device 712 (e.g., a peripheral device) to the USB bus port 730, the USB device 712 connects to the USB bus 713. One or more USB devices (peripheral devices or USB hubs) are able to connect to the digital computer 702 by connecting to the USB bus 713. For example, one or more of the display screen 704, the printer device 706, the floppy disk drive 708, the hard drive 710 could be connected to the USB bus 713 instead of connecting directly to the peripheral bus 724. Similarly, other devices such as a network interface connection, are able to be connected to the USB bus 713 to send and receive data over a network connected to other computer systems.

Further, according to the invention, the USB bus 713 includes a wireless USB bus link between a pair of transceivers. In one example, one of the transceiver would connect the USB bus port 730 and the other of the transceiver would connect to the USB device 712 which may or may not be a hub. Hence, in this example, the USB bus 713 between the USB bus port 730 and the USB device 712 is wireless and therefore the USB specification cable length limitation of five (5) meters is avoided.

The keyboard controller 726 is used to receive input from keyboard 714 and send decoded symbols for each pressed key to microprocessor 716. The display screen 704 is an output device that displays images of data provided by the microprocessor 716 via the peripheral bus 724 or provided by other components in the computer system 700. The printer device 706 when operating as a printer provides an image on a sheet of paper or a similar surface. Other output devices such as a plotter, typesetter, etc. can be used in place of, or in addition to, the printer device 706.

The floppy disk drive 708 and the hard disk drive 710 can be used to store various types of data. The floppy disk drive 708 facilitates transporting such data to other computer systems, and hard disk drive 710 permits fast access to large amounts of stored data.

The microprocessor 716 together with an operating system operate to execute computer code and produce and use data. The computer code and data may reside on the RAM 720, the ROM 722, or the hard disk drive 720. The computer code and data could also reside on a removable computer readable medium and loaded or installed onto the computer system 700 when needed. Removable program mediums include, for example, CD-ROM, PC-CARD, floppy disk and magnetic tape.

The keyboard 714 is used by a user to input commands and other instructions to the computer system 700. Other types of user input devices can also be used in conjunction with the present invention. For example, pointing devices such as a computer mouse, a track ball, a stylus, or a tablet can be used to manipulate a pointer on a screen of a general-purpose computer.

The advantages of the invention are numerous. One advantage of the invention is that freedom and mobility of access to USB devices is provided because the maximum cable length limitation is avoided. Another advantage of the invention is that USB devices are able to communicate with any USB hub using radio frequency signals, and thus allows USB devices to be shared. Still another advantage of the invention is that the wireless USB provided by the invention can be used for various purposes such as wireless networking with a server.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A system comprising:
   a computer having a USB port;
   a first apparatus having a first transceiver directly connected to the USB port of the computer;
   a peripheral device; and
   a wireless USB bus link, the first transceiver to communicate wireless signaling over the wireless USB bus link to enable communication between the computer and peripheral device.

2. The system of claim 1, further comprising a second apparatus having a second transceiver to exchange wireless signaling with the first transceiver over the wireless USB bus link.

3. The system of claim 2, wherein the second apparatus further comprises a hub directly connected to the second transceiver, the hub further connected to the peripheral device.

4. The system of claim 3, wherein the hub is connected to the peripheral device over a USB bus link.

5. The system of claim 1, further comprising a second transceiver to exchange wireless signaling with the first transceiver over the wireless USB bus link, the second transceiver directly connected to the peripheral device.

6. The system of claim 1, further comprising a second transceiver to exchange wireless signaling with the first transceiver over the wireless USB bus link, the second transceiver being part of the peripheral device.

7. The system of claim 1, further comprising:
   a hub connected to the peripheral device;
   a second peripheral device connected to the hub; and
   a second transceiver associated with the hub, the second transceiver to communicate wireless signaling over the wireless USB bus link with the first transceiver.

8. The system of claim 7, wherein the hub is connected to the peripheral devices over respective wireless USB bus links.

9. An apparatus for communicating with a computer, comprising:
   plural peripheral devices;
   a hub having ports connected to the plural peripheral devices; and
   a transceiver directly connected to the hub to communicate over a wireless USB bus link with the computer.

10. The apparatus of claim 9, wherein the hub is connected by USB bus links to the peripheral devices.

11. A method of communicating between a computer and a peripheral device, comprising:
    providing at least a first transceiver directly connected to one of the computer and peripheral device; and
    transmitting wireless signaling using the first transceiver over a wireless USB bus link to provide communication between the peripheral device and computer.

12. The method of claim 11, further comprising providing a second transceiver coupled to the other one of the computer and peripheral device,
    wherein transmitting the wireless signaling over the wireless USB bus link is between the first and second transceivers.

13. A method of communicating between a computer and a peripheral device, comprising:
    providing at least a first transceiver directly connected to a hub, the hub connected to the peripheral device; and
    transmitting wireless signaling using the first transceiver over a wireless USB bus link to provide communication between the peripheral device and computer.

14. The method of claim 13, further comprising:
    connecting a second peripheral device to the hub to enable the second peripheral device to communicate with the computer over the wireless USB bus link.

15. A radio frequency transceiver apparatus for providing a wireless USB bus, comprising:
    a USB connector for connecting to a hosting device;
    a USB interface electrically connected to the USB connector;
    a radio frequency transceiver electrically connected to the USB interface, the transceiver to transmit and receive radio frequency signals; and
    an antenna operatively connected to the transceiver,
    wherein the transceiver comprises:
        a modulator to modulate digital signals to be transmitted to produce analog signals of a first frequency;
        an up-converter operatively connected between the modulator and the antenna, the up-converter to convert the analog signals of the first frequency to analog signals of a second frequency that is higher than the first frequency, and to supply the signals of the second frequency to the antenna;

a down-converter to receive incoming analog signals of the second frequency from the antenna and to convert the incoming analog signals to incoming analog signals of the first frequency that is lower than the second frequency; and a demodulator operatively connected to the down-converter, the demodulator to demodulate the incoming analog signals to obtain incoming digital signals.

16. The radio frequency transceiver apparatus of claim 15, wherein the modulator modulates the digital signals using OPSK modulation.

17. The radio frequency transceiver apparatus of claim 15, wherein the transceiver further comprises:

a phase-lock-loop to synchronize with the incoming analog signals to synchronize with the first frequency.

18. The radio frequency transceiver apparatus of claim 17, wherein the transceiver apparatus has an active state and a low power state, and wherein the transceiver apparatus further comprises:

a power management unit to place the transceiver apparatus in one of the low power state and the active state.

19. A computer system comprising:

a USB host controller; and a first transceiver coupled to the USB host controller to communicate wireless signaling over a wireless USB bus with at least one of:

a second transceiver directly connected to a hub for coupling to plural peripheral devices; and a third transceiver that is part of a peripheral device.

* * * * *